July 22, 1958 A. E. REITZ 2,843,950
CHANGEABLE DISPLAY DEVICE
Filed July 3, 1957 2 Sheets-Sheet 1
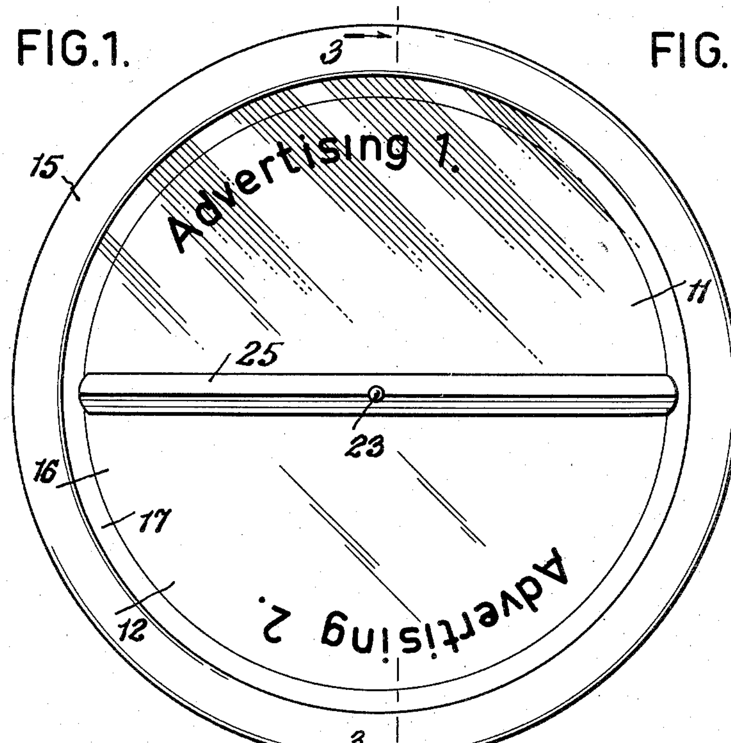
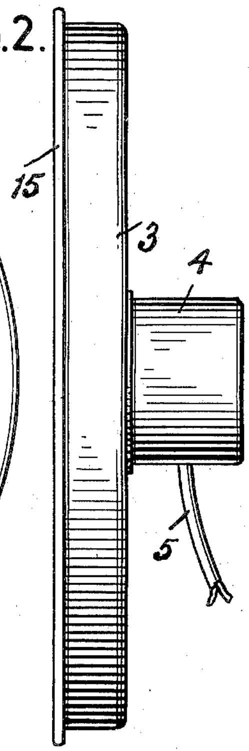
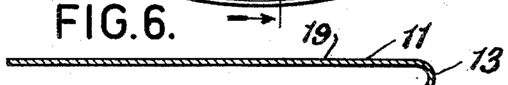
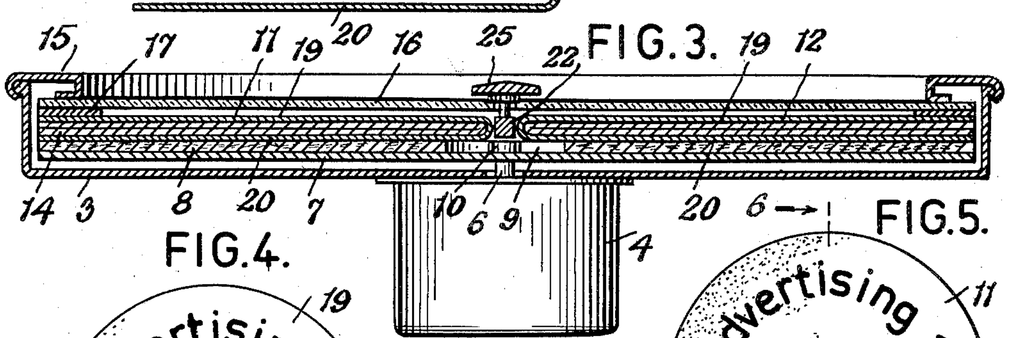
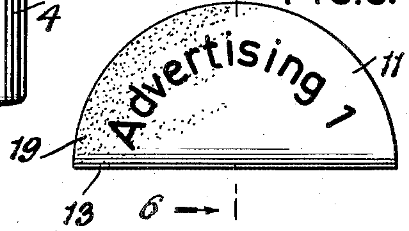
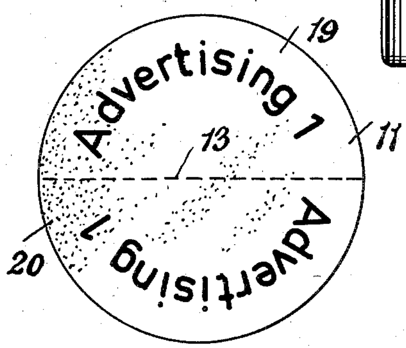
INVENTOR:
ARCHIE E. REITZ
BY
Frederick Breitenfeld
Attorney

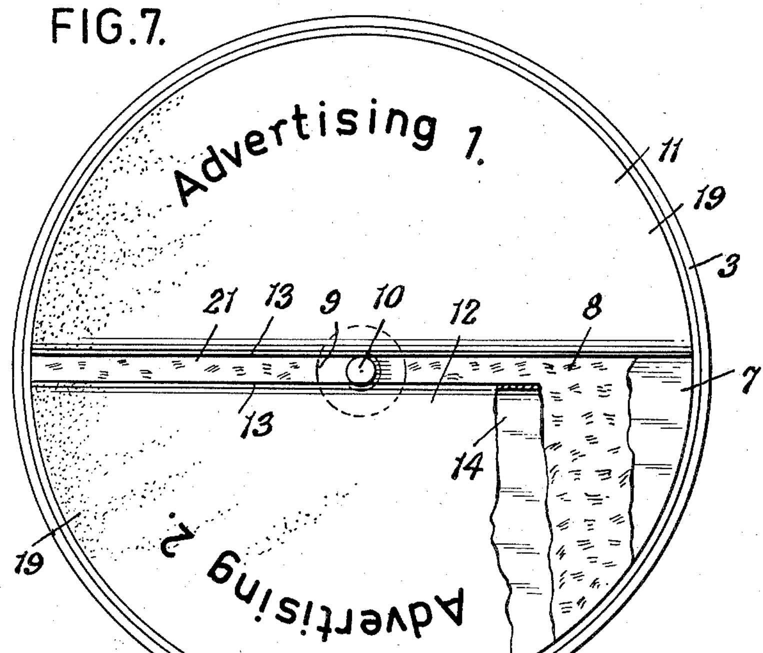
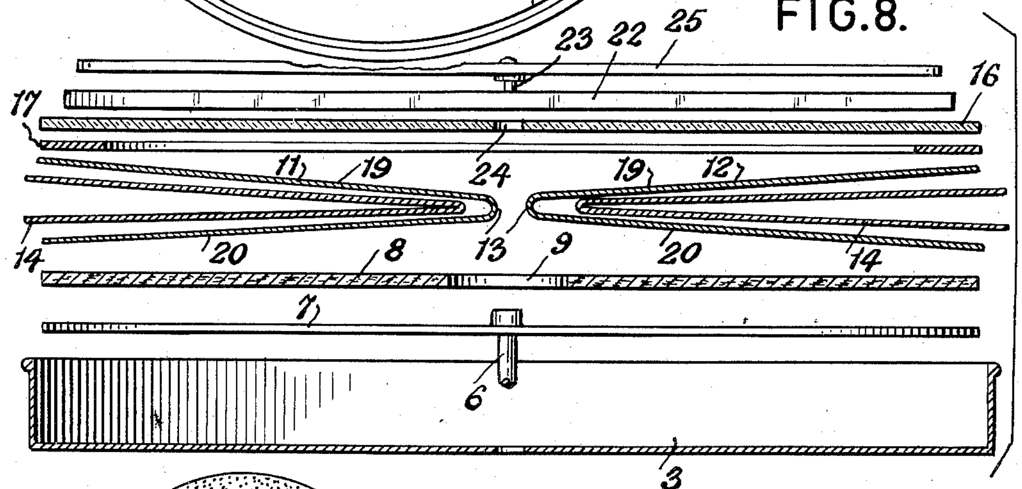
FIG.9.
17
16
24
INVENTOR:
ARCHIE E. REITZ
BY
Frederick Breitenfeld
Attorney United States Patent Office 2,843,950

Patented July 22, 1958

1

2,843,950

CHANGEABLE DISPLAY DEVICE

Archie E. Reitz, Los Angeles, Calif.

Application July 3, 1957, Serial No. 669,731

11 Claims. (Cl. 40—34)

This invention relates generally to display devices, and has particular reference to a changeable exhibitor having qualities of mystification to arrest attention.

The illusion created by the improved device is of a circular display surface over which a diametrically arranged strip slowly rotates on its central axis, each advancing radial half of said strip mysteriously expunging the display in front of it and bringing a different display progressively into view behind it.

The general object of the invention is to provide this illusion by means of a device that is structurally simple, inexpensive to manufacture, and reliable and economical to operate. The device is intended primarily for advertising displays, but is of course not limited to such use, and may be made of small or large size depending upon its purpose. The invention lends itself readily to the manufacture, in commercial quantities, of relatively small devices admirably adapted to operate on store counters or in shop windows. The device is so designed that a miniature low-cost electric motor may be employed, operable either by a battery or from an ordinary house circuit of 110 volts.

Briefly stated, the structure is predicated upon the unique characteristics of a circular sheet of flexible material folded along a diameter to define two overlying semi-circular halves, the two halves being continuously shifted rotationally, one upon the other, to bring display matter on the outer surface progressively into view on each half. The desired rotational shifting is accomplished by sandwiching the sheet between a pair of traction elements arranged in spaced opposed relation, each element engaging one of said semi-circular halves in a non-slip manner, and by establishing a relative rotation of said traction elements about an axis concentric with the display sheet. The relative rotation may be achieved by holding one of the traction elements stationary and rotating the other, or by rotating them in opposite directions, or by rotating them in the same direction but at different speeds. Preferably two folded-over display sheets are employed arranged side by side with the diametrical folds in parallel adjacence. Preferably, also, the device comprises the relatively simple and inexpensive expedient of employing a turntable as one of the traction elements and securing a stationary traction element to the turntable support. A shallow housing having parallel rear and front walls, at least one of which is at least partially transparent, is a commercially practical construction by means of which the essential parts of the device may be enclosed and actuated in the contemplated manner.

These general objectives may be attained in various ways, and a preferred embodiment of the invention is illustrated in the accompanying drawings, in which—

Figure 1 is a front elevational view of a display device constructed according to the invention;

Figure 2 is a side elevational view of the same;

Figure 3 is a sectional view, taken substantially on the line 3—3 of Figure 1;

2

Figure 4 is a face view, on a reduced scale, of one of the flexible display sheets;

Figure 5 shows the disk of Figure 4 in its folded condition;

Figure 6 is a sectional view, taken substantially on the line 6—6 of Figure 5;

Figure 7 is a front elevational view of the device, with the front wall removed and with parts shown fragmentarily;

Figure 8 is an exploded view of the major parts of the device, with some of the parts in section; and Figure 9 is a view of the transparent pane forming part of the cover, or front wall, and showing the non-slip annulus applied to the pane.

I have chosen to illustrate the invention as it may be embodied in a small-size portable display device useful as an advertising or attention-arresting medium in a store window or the like. The display area in this case is about twelve inches or so in diameter and the flattened disc-like housing is less than an inch in thickness. The device may be supported in any of various ways and it makes no difference whether the display face is vertical or horizontal. The operating medium in an apparatus of this kind may be any miniature electric motor of known kind, operable from a battery or otherwise. An ordinary synchronous electric-clock motor is satisfactory.

In the form shown, the device includes a round, cup-shaped housing 3, to the back of which there is secured the electric motor 4 to which current is supplied through the conventional cord 5. The shaft 6 of the motor 4 extends into the casing 3 through an opening in the rear wall of the casing, and is attached to a disc 7, constituting a turntable. The turntable is rotated at a relatively slow speed by means of the motor 4. Adhesively or otherwise attached to the outer face of the turntable 7 is a disc 8 of facing material having non-slip characteristics, such as cork, this facing 8 being provided with a central aperture 9 to clear a central projection 10 provided on the outer face of the turntable for a purpose presently to be described.

Rested against the surfacing 8 of the turntable are two similar circular display sheets, indicated respectively at 11 and 12. Each of these is composed of thin, flexible material, such as coated textile fabric or sheet rubber or plastic, the requisite being that the material have great flexibility, resistance to frictional wear, and that its outer or exposed face, bearing the display or advertising indicia, shall resist slippage and afford traction when engaged by a traction element such as the turntable 7.

In placing the two parts 11 and 12 in operative position, each sheet is first transversely folded on a diameter 13 (Figure 4) so that it presents a doubled-over element of semi-circular shape having an outer half or flap 19 and an inner half or flap 20. The two sheets 11 and 12 are then placed in side-by-side relationship on the cork-covered face of the turntable 7, substantially as shown in Figures 3 and 7. It will be noted that the diametrical fold lines are in parallel adjacence. In order to maintain the sheets 11 and 12 in proper condition and to prevent them from becoming distorted or crumpled during operation of the device, inserts 14 may be placed between the semi-circular halves. These inserts 14 may be composed of folded-over cardboard or of other relatively stiff material possessing slippery or smooth surfaces over which the sheets 11 and 12 may slide freely during the operation of the device. The inserts are semi-circular and correspond in size and shape to the folded sheets 11, 12. Each insert 14 has a rounded straight edge to support the fold line of the overlying display sheet.

At the front, the casing 3 receives a rim or frame 15 which carries a transparent pane 16 of glass or other suitable material. Adhesively attached to the back face of the pane 16 adjacent to its marginal edge is a ring or annulus 17 of non-slip material, such as abrasive material. When the cover is fitted in place to form the front wall of the housing 3, the non-slip ring 17 will rest against the outer section or flap 19 of each of the sheets 11 and 12, while urging the inner section or flap 20 into firm contact with the non-slip surfacing 8 of the turntable.

The turntable and the front wall of the housing are thus a pair of parallel opposed traction elements between which the folded-over display sheets are sandwiched.

As will be noted in Figure 7, when the two folded sheets 11 and 12 are placed on the turntable, a space 21 is provided between them. Confined in this space 21 is a bar 22, preferably of non-round cross-sectional shape. The bar is mounted on a spindle or shaft 23 which is journaled in an aperture 24 at the center of the pane 16, the spindle being freely rotative in this aperture. Secured on the outer end of the spindle 23 is a strip member or concealment plate 25 which is located on the outside of the pane 16 and is of a width sufficient to cover and conceal the spacing 21 between the parts 11 and 12. The strip member 25 may be made in an ornamental form or to simulate some known object.

The two sheets 11 and 12 may have their outer, non-slip surfaces 19, 20 imprinted or otherwise provided with display or advertising matter, and the display matter on one disc, as indicated in the drawing as "Advertising 1" is deliberately made to be noticeably different from that borne by its companion sheet and indicated as "Advertising 2." When the parts of the device are in the position shown in Figures 1 and 2, and the motor 4 is set in operation, the turntable 7 will rotate and since its non-slip surfacing 8 is held in firm and non-slip contact with the inner sections 20 of the sheets 11 and 12, while their outer sections 19 are frictionally engaged by the stationary ring 17, the inner sections will begin to move, thus rotatively shifting the two folded sheets upon themselves. During this movement they slip with respect to the inserts 14 which remain with them at all times. The effect secured by this movement is that of a progressive covering over of the display in advance of each rotating arm of the plate 25 and a simultaneous progressive uncovering of a totally different display in its wake. Since the viewer believes that the display surface is a single continuous area, the elimination of one display and the creation of a different display is mystifying. This is due in large measure to the fact that the gap 21 between the folded sheets is covered and concealed by the plate 25. The plate 25 is parallel to and carried along with the bar 22, since they are both secured to the common shaft 23, hence the rotative movements imparted to the bar 22 as the display assemblies rotate are transmitted to the plate 25, thus keeping it always in an overlying relation to the diametric gap which is to be concealed.

Since the bar 22 rotates at one-half the angular rate of speed of the turntable 7, it is important that inadvertent contact between the turntable and bar be prevented. The projection 10 accomplishes this, since contact between the bar 22 and the turntable, if it occurs at all, is thus confined to the immediate vicinity of the rotational axis where the contact would have a minimal effect.

The device illustrated has only the front wall composed (at least in part) of transparent material. The rear wall might be similarly constructed, thus making it possible to view the display from both sides. In such an event, the driving of the rear wall (which would serve the function of the turntable) would be by rotational force (preferably) applied to its periphery. It would move twice as fast as the concealment plate on that side (corresponding to the plate 25) but this would not materially affect the mystifying illusion.

In general it will be understood that the device may be modified in numerous respects without necessarily departing from the spirit and scope of the invention as expressed in the appended claims.

I claim:

1. A display device comprising a pair of traction elements arranged in spaced opposed relation, a circular sheet of flexible material bearing a display on one surface thereof and doubled upon itself along a diameter with said display surface outward, said sheet being sandwiched between said traction elements with its oppositely facing semi-circular halves in non-slip engagement with said traction elements, and means for establishing relative rotation of said elements about an axis concentric with said sheet, whereby said sheet will shift rotatively upon itself to progressively expose said display on each of said halves.

2. A display device as set forth in claim 1, in which there is a second circular sheet of similar character arranged alongside the first with the diametrically disposed fold lines of said sheets in parallel adjacence.

3. A display device as set forth in claim 2, in which a diametrically arranged bar is disposed between said fold lines and is journaled in one of said traction elements for rotation about said axis.

4. A display device comprising a housing having a rear wall and a parallel front wall at least partially transparent, a turntable journaled in the rear wall, opposed traction surfaces formed on said turntable and front wall, and a pair of circular sheets of flexible material each bearing a display on one surface thereof and doubled upon itself with said display surface outward, said sheets being arranged side by side with the diametrical fold lines in parallel adjacence, said sheets being sandwiched between said turntable and front wall in concentric relation to the turntable and with the oppositely facing semi-circular halves of each sheet in non-slip engagement with said traction surfaces, whereby rotation of the turntable will cause each of said sheets to shift rotatively upon itself to progressively expose its display through said front wall.

5. A display device as set forth in claim 4, in which there is a smooth-surfaced semi-circular insert between the halves of each sheet, said insert having a rounded straight edge to support the diametric fold of the overlying sheet.

6. A display device as set forth in claim 4, in combination with a bar positioned between said diametrical fold lines and journaled in said front wall on a concentric axis, said bar being rotated by said fold lines when the turntable is rotated, and a concealment plate parallel to said bar and wide enough to overlie both fold lines and thereby conceal them, said bar and concealment plate being mounted on a common stub shaft extending through said front wall, the plate being on the outside of said wall.

7. A display device comprising a rotative element, a circular sheet of flexible material bearing a display on one surface thereof and double upon itself along a diameter with said display surface outward, said sheet being positioned with one of its semi-circular halves in facial contact against the rotative element and concentric therewith, non-slip surfacing on said rotative element for establishing traction between it and the semi-circular half of the sheet that is in contact with it, and a stationary element positioned against the other semi-circular half of the sheet and provided with non-slip means for establishing traction between it and the half of the sheet with which it contacts, whereby said sheet shifts rotatively upon itself to progressively expose said display on each of said halves.

8. A display device comprising a cup-shaped housing, a motor at the back thereof, a shaft from the motor extending into the housing, a turntable mounted on the shaft, a non-slip surfacing on the face of the turntable, a pair of transversely-folded circular sheets of thin, flexible material formed into semi-circular shape and placed flatly against the non-slip material and each presenting one half of its area in facial contact with the turntable, a cover member for the housing in the form of a glass-holding frame, the glass in said frame having a ring of non-slip material on its inner face adjacent to its marginal edge, said ring being maintained in facial contact with the outer halves of the folded sheets, whereby said ring will hold said outer halves against slippage relatively to the glass while the inner half of each of the sheets is moved by rotative movement of the turntable.

9. A display device comprising a pair of traction elements arranged in spaced opposed relation, a pair of circular sheets of flexible material each bearing a display on one surface thereof and doubled upon itself along a diameter with said display surface outward, said sheets being arranged side by side with the diametrical fold lines in parallel adjacence, said sheets being sandwiched between said traction elements with the oppositely facing semi-circular halves of each sheet in non-slip engagement with said traction elements, means for establishing relative rotation of said traction elements about an axis concentric with said sheets whereby each sheet will shift rotatively upon itself to progressively expose its display on each of said halves, a diametrically arranged bar lying between said fold lines, and a concealment plate parallel to and secured to said bar and movable therewith, said plate being wide enough to overlie both fold lines and thereby conceal them.

10. A display device as set worth in claim 1, one of said traction elements being a transparent pane provided on its inner face with an annulus of non-slip material concentric with the rotational axis.

11. A display device as set forth in claim 9, in which there is a means for maintaining said bar out of contact with said turntable in the regions radially beyond the immediate vicinity of the rotational axis.

References Cited in the file of this patent

UNITED STATES PATENTS

| | | |
|---|---|---|
| 1,404,194 | Emerson et al. | Jan. 24, 1922 |
| 1,547,864 | Etcheto | July 28, 1925 |
| 2,663,959 | Fuerst | Dec. 29, 1953 |